United States Patent [19]

Shuji et al.

[11] Patent Number: 4,967,073
[45] Date of Patent: Oct. 30, 1990

[54] LIGHT SCANNING DEVICE HAVING A SYNCHRONIZING GRID WITH A PHASE-DETECTED STARTING POINT AREA

[75] Inventors: Ono Shuji; Tsutomu Kimura, both of Kanagawa; Yoshimi Takasaki, Tokyo, all of Japan

[73] Assignee: Fuji Photo Film Co., Ltd., Kanagawa, Japan

[21] Appl. No.: 416,559

[22] Filed: Oct. 3, 1989

Related U.S. Application Data

[63] Continuation-in-part of Ser. No. 314,230, Feb. 21, 1989, abandoned, which is a continuation of Ser. No. 39,842, Apr. 20, 1987, abandoned.

[30] Foreign Application Priority Data

Apr. 18, 1986 [JP] Japan ................................. 61-90544

[51] Int. Cl.⁵ .......................... G02B 26/10; H01J 3/28
[52] U.S. Cl. ................................. 250/235; 250/237 G
[58] Field of Search .................... 250/235, 236, 237 G, 250/231.14, 231.17; 350/6.5, 6.7, 6.8, 6.9, 6.91; 358/494, 496

[56] References Cited

U.S. PATENT DOCUMENTS

| | | | |
|---|---|---|---|
| 3,985,448 | 10/1976 | Wiklund et al. | 250/236 |
| 4,178,064 | 12/1979 | Mrdjen | 250/235 |
| 4,449,046 | 5/1984 | Zuckerman et al. | 250/235 |
| 4,518,998 | 5/1985 | Warner | 250/235 |
| 4,602,154 | 6/1986 | Taniguchi | 250/235 |
| 4,647,145 | 3/1987 | Maeda et al. | 350/6.8 |
| 4,667,099 | 5/1987 | Arai et al. | 250/237 G |

Primary Examiner—Edward P. Westin
Attorney, Agent, or Firm—Sughrue, Mion, Zinn, Macpeak & Seas

[57] ABSTRACT

Scanning and synchronizing light beams are deflected by a light deflector. The scanning light beam is used to scan an object surface, whereas the synchronizing light beam is applied to a grid for generating a synchronizing signal to detect the scanning position of the scanning light beam on the object surface. The grid includes a starting point control area, corresponding to a main scanning cycle starting position on the object surface, for modulating the synchronizing light beam applied to the grid so that light having passed through the starting point control area will have a different phase than the light from the other portion of the grid.

4 Claims, 4 Drawing Sheets

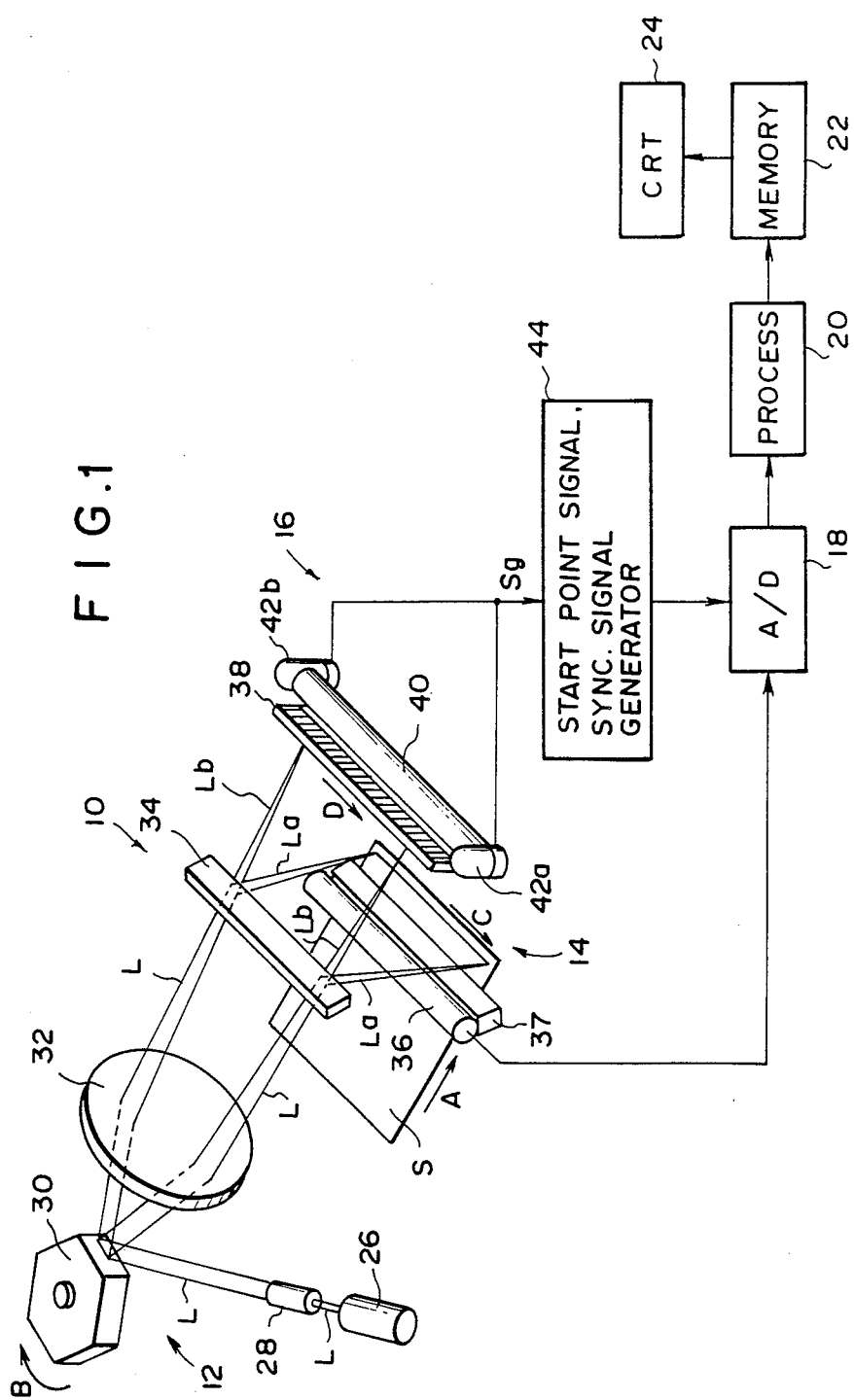

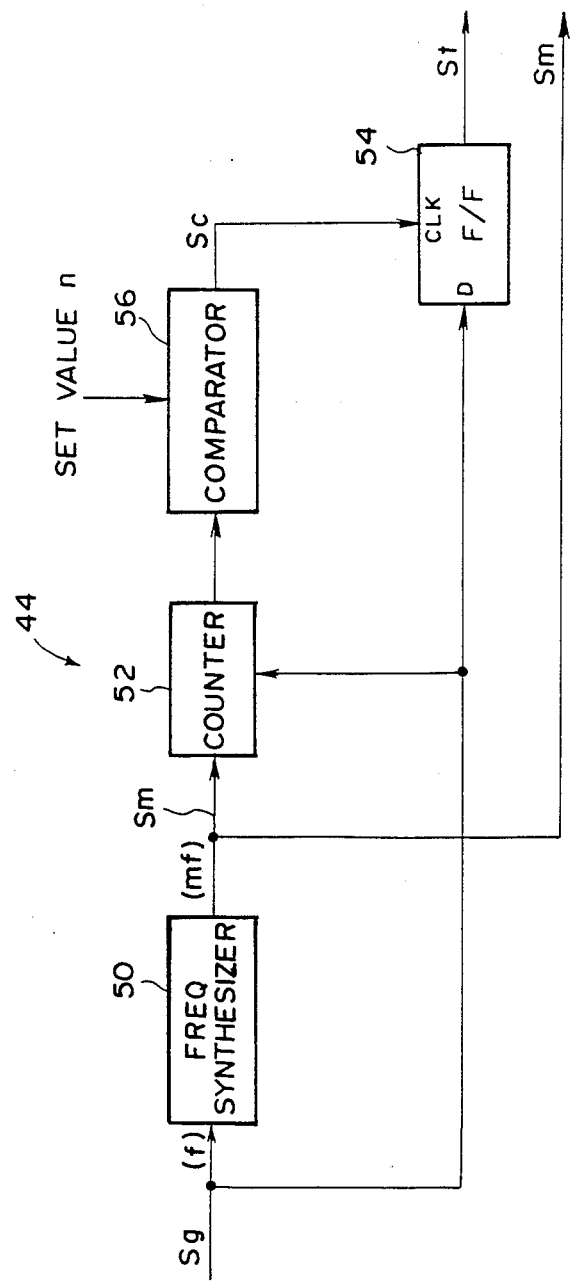

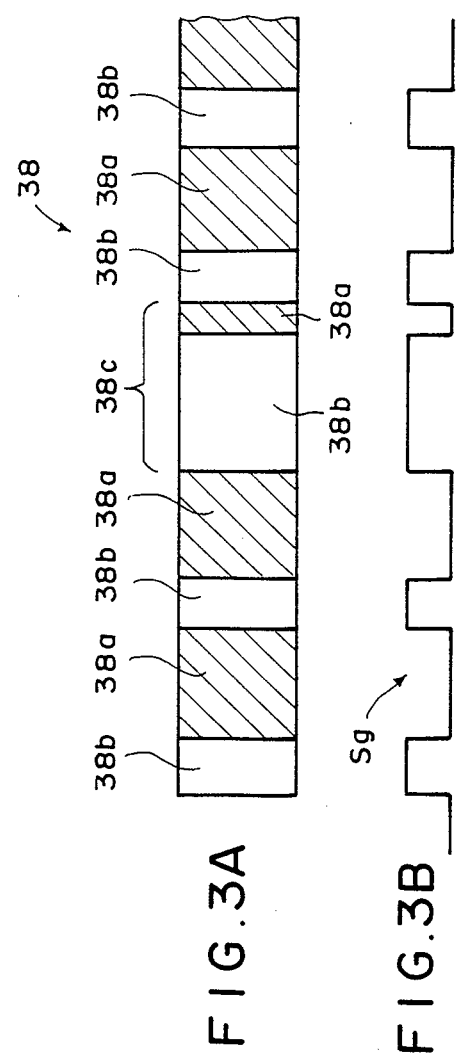

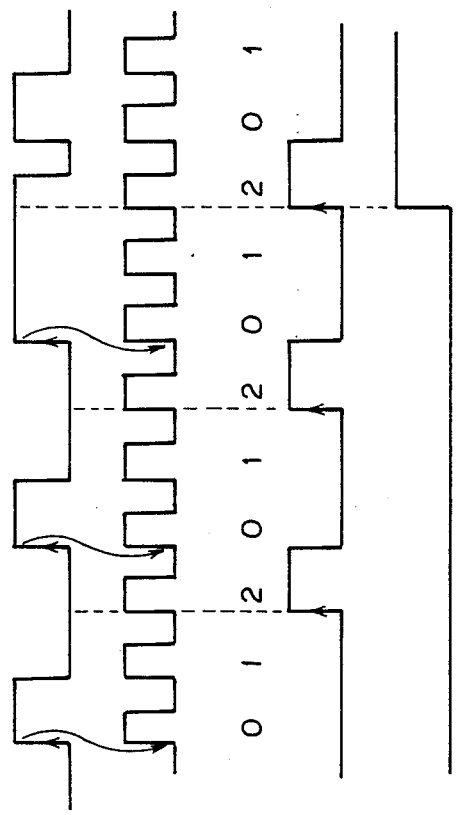

LIGHT SCANNING DEVICE HAVING A SYNCHRONIZING GRID WITH A PHASE-DETECTED STARTING POINT AREA

This application is a continuation-in-part application of application Ser. No. 314,230 filed Feb. 21, 1989 now abandoned, which is a continuation application of application Ser. No. 39,842 filed Apr. 20, 1987 now abandoned.

BACKGROUND OF THE INVENTION

1. Field of the Invention

The present invention relates to a light scanning device for deflecting a light beam to scan a desired surface, and more particularly to a light scanning device capable of deflecting a scanning light beam employed to scan a desired surface and a synchronizing light beam employed to produce a synchronizing signal indicative of the scanning position of the scanning light beam.

2. Description of the Prior Art

In recent years there have been developed various light scanning devices for reading out and/or recording images with a light beam. In such light scanning devices, a light beam produced by a light source is reflectively deflected by a light deflector to scan a desired object surface in a main scanning direction, while at the same time the object surface is being moved at a constant speed in a sub-scanning direction which is substantially normal to the main scanning direction. If highly accurate scanning is required in the light scanning device, then it is necessary to generate a synchronizing signal representative of the scanning position of the light beam on the object surface being scanned. One conventional way of producing a synchronizing signal has been to deflect a synchronizing light beam with the light deflector and arrange a grid with alternate bright and dark regions on the path of the synchronizing light beam so that the grid is scanned by the synchronizing light beam. The light that has passed through or been reflected by the grid is detected by a light detector, which applies a light signal to a synchronizing signal generator that converts a change in the detected amount of light to a corresponding electric pulse signal. Thus, a synchronizing signal can be generated by detecting periodic changes in the amount of light which has passed through or been reflected by the grid as it is scanned by the synchronizing light beam.

In addition to the above positional detection of the light beam in a scanning line on the object surface, it is also necessary to control the starting point of effective scanning for initiating a substantial recording or read-out cycle for each scanning line. To effect such starting point control, conventional light scanning devices have another light detector positioned on one side of the surface to be scanned. The second light detector detects the scanning light beam and generates a detection signal each time the scanning light beam traverses the light detector. Effective scanning is started in response to such a signal generated by the light detector. With the second light detector provided in addition to the grid, however, the light scanning device is complex in structure. Particularly, a light scanning device wherein sheets of different sizes are to be scanned is quite complex and highly costly to manufacture since a plurality of light detectors have to be located in positions appropriate for the different sheet sizes In order for the light detector to control the scanning starting point and for the grid to detect the scanning position, it is also necessary to put into phase a positional signal produced from the grid and a starting point signal generated by the second light detector. The procedure for fine adjustment of the positions of various components to achieve such phase equalization is however tedious and time-consuming.

SUMMARY OF THE INVENTION

In view of the aforesaid problems of the conventional light scanning devices, it is an object of the present invention to provide a light scanning device having a grid capable of detecting the position of a scanning light beam and controlling a starting point of effective scanning, so that the light scanning device is simpler in construction and no tedious and time-consuming procedure for positional adjustment is required.

According to the present invention, there is provided a light scanning device for two-dimensionally scanning an object surface by scanning the object surface in a main scanning direction with a scanning light beam while moving the object surface in a direction substantially normal to the main scanning direction, comprising:

a light source for emitting the scanning light beam;

a light deflector for reflectively deflecting the light beam in the main scanning direction;

means for deriving a synchronizing light beam from said light beam reflectively deflected by said light deflector;

a grid extending in said main scanning direction for receiving said synchronizing light beam; and means for detecting light from said grid to detect the position of said scanning light beam in said grid scanning direction on the object surface;

said grid defining a linear array of alternate, relatively light and dark bars disposed at a constant pitch with the exception of a starting point control area inwardly spaced from an end of the array, said starting point control area defining a sharp irregularity relative to said constant pitch corresponding to a main scanning cycle starting position, on the object surface, said irregularity modulating the synchronizing light beam applied to the grid so that light having passed through the starting point control area will have a different phase corresponding to said irregularity relative to said constant pitch than the light from the other portion of said grid.

With the light scanning device in accordance with the present invention, the pitch at which the light and dark bars of the grid are disposed is changed sharply at the position corresponding to a point at which the main scanning cycle is started. A signal corresponding to the position at which the main scanning cycle is started is generated by a phase detecting circuit comprising a counter, a comparator, a flip-flop and the like. Therefore, the number of optical elements can be kept very small and the configuration of the light scanning device can be simplified markedly as compared with cases where light detectors are provided, besides a grid, in order to control the point at which the main scanning cycle is started. Particularly, even when object surfaces having different sizes are to be scanned, a plurality of light detectors need not be provided as in the conventional technique. Also, because both the detection of the position at which the scanning light beam is scanning and the control of the point at which the main scanning cycle is started are carried out based on a single grid, the phase of a synchronizing signal, which represents the position at which the scanning light beam is scanning, and the phase of a starting point detection signal which serves as a starting point synchronizing signal can be set as desired. Therefore, no particular operations are required to match the phases for each of light detectors.

When the scanning light beam reaches the main scanning cycle starting position on the object surface, the synchronizing light beam that passes through or is reflected by the grid at the starting point control area is modulated in a manner different from that in which the synchronizing light beam is modulated by the other portion of the grid. By detecting such a differently modulated light beam, a starting point signal can be generated for starting effective scanning of the object surface with the scanning light beam. The starting point control area corresponding to the main scanning cycle starting position on the object surface is not limited to a position on the grid where the synchronizing light beam is applied at the same time that the scanning light beam is applied to the main scanning cycle starting position, but may be any position which is related in a certain way to the main scanning cycle starting position. For example, the effective scanning of the object surface may be started upon elapse of a certain period of time after the synchronizing light beam has been applied to the starting point control area, so that the starting point control area may be located outwardly of the above position on the grid.

The scanning light beam and the synchronizing light beam may be generated by respective independent light sources, or may be divided by a semi-transparent mirror or the like from a signal light emitted from a single light source before or after being deflected by the light deflector.

The grid has an array of alternate dark and bright bars at a constant pitch, and the starting point control area comprises dark and bright bars of a pitch different from the constant pitch, whereby light having passed through the starting point control area will have a different phase than the light from the other portion of the grid.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a schematic view showing an embodiment of the light scanning device in accordance with the present invention, FIG. 2 is an explanatory view showing the configuration of a starting point detection signal and synchronizing signal generator in the embodiment of FIG. 1, FIG. 3A is an explanatory view showing an example of a grid, FIG. 3B is an explanatory view showing a grid signal generated by the grid shown in FIG. 3A, and FIGS. 4A, 4B, 4C, 4D and 4E are timing charts showing the operations of the starting point detection signal and synchronizing signal generator shown in FIG. 2.

DESCRIPTION OF THE PREFERRED EMBODIMENTS

The present invention will hereinbelow be described in further detail with reference to the accompanying drawings.

With reference to FIG. 1, a light scanning device 10 is basically constituted of a laser beam scanning section 12 for scanning an object surface, on which an image has been recorded, for example, the surface of a stimulable phosphor sheet S which has a radiation image stored thereon and which is conveyed in a sub-scanning direction indicated by the arrow A, with a laser beam L, and an image read-out section 14 for photoelectrically converting light, which is obtained during the scanning with the laser beam L and which carries information about the image, into an image signal. The light scanning device 10 also comprises a synchronizing signal generating section 16 for generating a starting point detection signal, which serves as a starting point synchronizing signal, and a synchronizing signal, which represents the position at which the laser beam L is scanning, from the laser beam L, and an A/D converter 18 which digitizes the image signal obtained from the image read-out section 14 on the basis of the synchronizing signal. The light scanning device 10 further comprises an image processing section 20 which processes the output signal of the A/D converter 18 in order to, for example, enhance the image contour, an image signal memory 22 which stores the output signal of the image processing section 20, and a display means 24, such as a CRT, which reproduces the output signal of the image signal memory 22 into a visible image.

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. Also, a sheet provided with a layer of the stimulable phosphor is referred to as a stimulable phosphor sheet.

The laser beam L produced by a laser beam source 26 of the laser beam scanning section 12 is passed through a beam expander 28 which converts the laser beam L into a beam having a desired diameter. The laser beam L having the desired diameter is reflected and deflected by a rotating polygon mirror 30 which is rotated in the direction indicated by the arrow B and which serves as a light deflector. Instead of being constituted of the rotating polygon mirror 30, the light deflector may be constituted of a galvanometer mirror, a hologram scanner, an acousto-optic deflector (AOD) or the like.

The laser beam L which has been reflected and deflected by the rotating polygon mirror 30 passes through a scanning lens 32 which is positioned in the optical path of the laser beam L and which may be constituted of an f$\theta$ lens. The laser beam L then impinges upon a semi-transparent mirror 34 which is located in the optical path of the laser beam L and which extends in the main scanning direction. The semi-transparent mirror 34 reflects part of the laser beam L the amount of which part is required to scan the stimulable phosphor sheet S and which part serves as a scanning laser beam La. Also, the semi-transparent mirror 34 transmits the remaining part of the laser beam L which part serves as a synchronizing laser beam Lb. The synchronizing laser beam Lb impinges upon a grid 38. The scanning laser beam La which has been reflected by the semi-transparent mirror 34 is converged on the stimulable phosphor sheet S and scans it in the main scanning direction indicated by the arrow C.

The image read-out section 14 comprises a long photomultiplier 36 which serves as a photoelectric conversion means, and a light guide member 36 for guiding light, which is emitted by the stimulable phosphor sheet S when the stimulable phosphor sheet S is exposed to the scanning laser beam La, to the light receiving face of the long photomultiplier 36. The amount of the emitted light is proportional to the amount of energy stored on the stimulable phosphor sheet S during exposure to radiation. The long photomultiplier 36 extends along the main scanning direction.

The light input face of the light guide member 37 is positioned close to the stimulable phosphor sheet S and extends along the main scanning direction indicated by the arrow C. The photomultiplier 36 photoelectrically converts the amount of light emitted by the stimulable phosphor sheet S into an image signal, and the image signal is fed to the image signal input terminal of the A/D converter 18.

The synchronizing signal generating section 16 comprises the grid 38 which extends in the direction along which the synchronizing laser beam Lb scans, a cylindrical light guide member 40 which is positioned on the rear side of the grid 38, and light sensors 42a and 42b which are provided at both ends of the light guide member 40 in order to detect the amount of the synchronizing laser beam Lb which has passed through the grid 38. The synchronizing signal generating section 16 also comprises a starting point detection signal and synchronizing signal generator 44 which generates a starting point detection signal, which serves as a starting point synchronizing signal, and a synchronizing signal, which represents the position at which the scanning laser beam La is scanning, from a grid signal Sg generated by the light sensors 42a and 42b.

It is necessary that the scanning laser beam La starts a main scanning cycle to effect substantial recording or readout (hereinafter referred to as an effective scanning cycle) from a predetermined position in the main scanning direction on the stimulable phosphor sheet S. For this purpose, the point at which the effective scanning cycle is started must be controlled for each scanning line. In this embodiment, the grid 38 having the configuration shown in FIG. 3A is utilized in order to control the starting points. Specifically, the grid 38 is constituted of light zones or bars 38b, 38b, ... which transmit the synchronizing laser beam Lb and dark zones or bars 38a, 38a, ... which block the synchronizing laser beam Lb. The light bars 38b, 38b, ... and the dark bars 38a, 38a, ... are alternately located at a constant pitch. The grid 38 also has a starting point control area 38c which is located in the vicinity of part corresponding to the point at which the effective scanning cycle is started. The starting point control area 38c is composed of light bars 38b, 38b, ... and dark bars 38b, 38b, ... which are located at a pitch different from the aforesaid constant pitch. The starting point control area 38c modulates the synchronizing laser beam Lb so that the phase thereof is different from the phase of the synchronizing laser beam Lb which has been modulated by the other part of the grid 38. Therefore, as shown in FIG. 3B, the grid signal Sg is obtained from the grid 38 so that the phase of the grid signal Sg corresponding to the starting point control area 38c is different from the phase of the grid signal Sg corresponding to the other part of the grid 38.

The output signal of the starting point detection signal and synchronizing signal generator 44 is fed to the synchronizing signal input terminal of the A/D converter 18.

In the image processing section 20, processing such as gradation processing or image contour enhancement processing is carried out on the image signal, which has been digitized by the A/D converter 18, on the basis of the synchronizing signal. The processed image signal is stored in the image signal memory 22 and used to reproduce a visible image on the display means 24.

FIG. 2 is a block diagram showing an example of the electric circuitry of the starting point detection signal and synchronizing signal generator 44. Basically, the starting point detection signal and synchronizing signal generator 44 comprises a frequency synthesizer 50 which multiplies the frequency f of the grid signal Sg by a factor of m, and a counter 52 which counts the pulses of the output signal (a multiplied-frequency grid signal Sm) of the frequency synthesizer 50. The starting point detection signal and synchronizing signal generator 44 also comprises a comparator 56 which compares the number, which the output signal of the counter 52 represents, with a predetermined number n and feeds a clock signal Sc to a clock input terminal CLK of a flip-flop 54 when the number which the output signal of the counter 52 represents is equal to the predetermined number n. The grid signal Sg is also fed to a reset input terminal Rs of the counter 52 and to a data input terminal D of the flip-flop 54. The output signals of the starting point detection signal and synchronizing signal generator 44, i.e. the modulation detection signal St generated by the flip-flop 54 and the multiplied-frequency grid signal Sm generated by the frequency synthesizer 50, are fed to the synchronizing signal input terminal of the A/D converter 18.

Operations and effects of this embodiment will be described hereinbelow. In FIG. 1, the stimulable phosphor sheet S which has been exposed to radiation, which has passed through an object, to store a radiation image of the object is conveyed by a conveyance means (not shown) in the sub-scanning direction indicated by the arrow A. At the same time, the surface of the stimulable phosphor, sheet S is scanned with the scanning laser beam La, which has been produced by the laser beam source 26 and reflected by the semi-transparent mirror 34, in the main scanning direction indicated by the arrow C. As the stimulable phosphor sheet S is exposed to the scanning laser beam La, it emits light the amount of which is proportional to the amount of energy stored thereon during exposure to radiation. The emitted light is guided by the light guide member 37 extending along the main scanning direction on the stimulable phosphor sheet S, and is converted by the long photomultiplier 36 into an electric signal. The electric signal is fed to the image signal input terminal of the A/D converter 18.

The synchronizing laser beam Lb which has passed through the semi-transparent mirror 34 impinges upon the grid 38 of the synchronizing signal generating section 16. As the rotating polygon mirror 30 is rotated, the synchronizing laser beam Lb scans one end of the grid 38 to the other end thereof in the direction indicated by the arrow D.

The synchronizing laser beam Lb which has passed through the light bars 38b, 38b, ... of the grid 38 impinges upon the light guide member 40, and is dispersed in various different directions by a dispersing region (not shown) which is provided on the side of the light guide member 40 opposite to the side on which the synchronizing laser beam Lb impinges. In this manner, the synchronizing laser beam Lb is guided inside of the light guide member 40 through repeated total reflection to the light sensors 42a and 42b. The synchronizing laser beam Lb is photoelectrically converted into the grid signal Sg by the light sensors 42a and 42b. As described above, the grid 38 has a wide light bar 38b in the starting point control area 38c which is located at a position corresponding to the point at which the effective scanning cycle is started. Therefore, the grid signal Sg has the waveform shown in FIG. 3B. The grid signal Sg is fed to the input terminal of the frequency synthesizer 50, the data input terminal D of the flip-flop 54, and the reset input terminal Rs of the counter 52.

FIGS. 4A through 4E are timing charts showing the operations of the starting point detection signal and synchronizing signal generator 44. By way of example, the multiplication factor m of the frequency synthesizer 50 is set to 3, and the predetermined number n in the comparator 56 is set to 2, which value is smaller than m. Upon receiving the grid signal Sg shown in FIG. 4A, the frequency synthesizer 50 outputs the multiplied-frequency grid signal Sm shown in FIG. 4B in which signal the frequency of the grid signal Sg has been multiplied by 3 with reference to each rising edge of the grid signal Sg. As shown in FIG. 4C, the counter 52 outputs the signal representing the number which is reset by each rising edge of the grid signal Sg and which changes in the order of 0, 0, 1, 2, 0, 1, 2, 0, 1, 2, 0, 1, . . . . in accordance with the multiplied-frequency grid signal Sm generated by the frequency synthesizer 50. The predetermined value n which serves as a reference value for comparison is set to 2 in the comparator 56, and therefore the comparator 56 generates the clock signal Sc shown in FIG. 4D in which signal a pulse is formed each time the output value of the counter 52 is 2. The clock signal Sc is fed to the clock input terminal CLK of the flip-flop 54. Because the grid signal Sg shown in FIG. 4A is fed to the data input terminal D of the. flip-flop 54, the output signal of the flip-flop 54, i.e. the modulation detection signal St which serves as the starting point synchronizing signal, is set to a high level at the rising edge of the clock signal Sc. Specifically, as shown in FIG. 4E, the modulation detection signal St is set to a high level at the part of the grid signal Sg which part corresponds to the wide light bar 38b of the grid 38.

Upon receiving the modulation detection signal St and the multiplied-frequency grid signal Sm, the A/D converter 18 is starts the A/D conversion of the image signal, which is generated by the long photomultiplier 36, at the same timing as when a pulse of the multiplied-frequency grid signal Sm (i.e. the synchronizing signal) is formed after the modulation detection signal St which serves as the starting point synchronizing signal is set to a high level. The image signal which has been digitized by the A/D converter 18 is fed into the image processing section 20 which carries out gradation processing, image contour enhancement processing or the like of the image signal. The processed image signal is stored in the image signal memory 22 and used to reproduce a visible image on the display means 24.

Although certain preferred embodiments have been shown and described, it should be understood that many changes and modifications may be made therein without departing from the scope of the appended claims. For example, the light scanning device in accordance with the present invention is also applicable to image recording apparatuses.

What is claimed is:

1. A light scanning device for two-dimensionally scanning an object surface by scanning the object surface in a main scanning direction with a scanning light beam while moving the object surface in a direction substantially normal to the main scanning direction, comprising:
   a light source for emitting the scanning light beam;
   a light deflector for reflectively deflecting the light beam in the main scanning direction;
   means for deriving a synchronizing light beam from said light beam reflectively deflected by said light deflector;
   a grid extending in said main scanning direction for receiving said synchronizing light beam; and
   means for detecting light from said grid to detect the position of said scanning light beam in said main scanning direction on the object surface;
   said grid defining a linear array of alternate, relatively light and dark bars disposed at a constant pitch with the exception of a starting point control area inwardly spaced from an end of the array, said starting point control area defining a sharp irregularity relative to said constant pitch corresponding to a main scanning cycle starting position on the object surface, said irregularity modulating the synchronizing light beam applied to the grid so that light having passed through the starting point control area will have a different phase corresponding to said irregularity relative to said constant pitch than the light from the other portion of said grid.

2. A device as defined in claim 1 wherein a phase detection means is provided to detect the phase of a synchronizing signal which is generated by said means for detecting light from said grid after said synchronizing light beam has been modulated by said irregularity defined by said starting point control area, and a signal generated by said phase detection means is used as a starting point synchronizing signal for synchronizing the point at which a main scanning cycle is started.

3. A device as defined in claim 2 wherein said phase detection means comprises a frequency synthesizer, an N-ary counter, where N denotes a natural number, which receives an output signal of said frequency synthesizer, a comparator for comparing the value, which an output signal of said N-ary counter represents, with a predetermined value, and a flip-flop circuit for receiving an output signal of said comparator which output signal serves as a clock signal, and a pulse signal which is fed into said frequency synthesizer and which serves as a data input signal.

4. A device as defined in claim 1 wherein said object surface is the surface of a stimulable phosphor sheet which has a radiation image stored thereon, and said scanning light beam is a beam of stimulating rays which cause the stimulable phosphor sheet to emit light the amount of which emitted light is proportional to the amount of energy stored on the stimulable phosphor sheet during exposure to radiation.

* * * * *

UNITED STATES PATENT AND TRADEMARK OFFICE
CERTIFICATE OF CORRECTION

PATENT NO. : 4,967,073

DATED : 10/30/90

INVENTOR(S) :
ONO ET AL

It is certified that error appears in the above-identified patent and that said Letters Patent is hereby corrected as shown below:

On the title page, item [75]:

Please correct the name of the first inventor from "Ono Shuji" to --Shuji Ono--.

Signed and Sealed this

Nineteenth Day of May, 1992

Attest:

DOUGLAS B. COMER

*Attesting Officer*    Acting Commissioner of Patents and Trademarks